ELECTRONIC EQUIPMENT PACKAGING

Filed Jan. 31, 1957 3 Sheets-Sheet 1

INVENTORS.
ALBIN A. GRADISAR
ALFRED S. GUTMAN
JOHN A. MEYER
BY
Spencer E. Olson
ATTORNEY April 19, 1960 A. A. GRADISAR ET AL 2,933,655

ELECTRONIC EQUIPMENT PACKAGING

Filed Jan. 31, 1957 3 Sheets-Sheet 2

INVENTORS.
ALBIN A. GRADISAR
ALFRED S. GUTMAN
JOHN A. MEYER

BY Spencer E. Olson

ATTORNEY.

April 19, 1960 A. A. GRADISAR ET AL 2,933,655

ELECTRONIC EQUIPMENT PACKAGING

Filed Jan. 31, 1957 3 Sheets-Sheet 3

*INVENTORS.*
ALBIN A. GRADISAR
ALFRED S. GUTMAN
JOHN A. MEYER

*BY* Spencer E. Olson

ATTORNEY

United States Patent Office 2,933,655
Patented Apr. 19, 1960

2,933,655

ELECTRONIC EQUIPMENT PACKAGING

Albin A. Gradisar, Los Altos, Calif., Alfred S. Gutman, Auburndale, Mass., and John A. Meyer, Tonawanda, N.Y., assignors, by mesne assignments, to Sylvania Electric Products Inc., Wilmington, Del., a corporation of Delaware Application January 31, 1957, Serial No. 637,476

11 Claims. (Cl. 317—100)

This invention relates to heat transfer apparatus, and is more particularly concerned with a packaging and cooling system for electronic equipment operating in an elevated temperature environment and where economy of cooling fluid is of extreme importance.

Most of the electric power used to operate present-day electronic equipment is converted into unwanted heat; only a small part of the power is converted into useful energy. This results in an undesirable temperature rise in the equipment, the magnitude of which depends upon the amount of heat dissipated by the equipment to its environment. In ordinary electronic equipment, such as in a television receiver, little special design effort is necessary to provide the requisite transfer of heat, since there is normally sufficient space around the tubes and other components of the chassis that adequate cooling is provided by natural convection of air over the assembly. In certain specialized electronic equipment, however, where space and weight are of prime importance, miniaturization is employed, resulting in much greater heat density and the attendant requirement of transferring the heat from the chassis. A good example is in the case of airborne electronic equipment where obviously economy of space and weight is very important. Electronic equipment for installation in subsonic aircraft has been designed with little emphasis on cooling, the equipment simply rejecting its heat to the surrounding air and to surrounding structure, depending on free convection, or in some cases, the cooling air being circulated at low velocities by small blowers. In most applications, this method of cooling was satisfactory since the ambient air temperature was low relative to the operating temperatures of the equipment, or a source of cool air could be made available through utilization of the blower. With the advent of supersonic aircraft, however, new problems are presented since under critical conditions, the resultant ram air temperatures exceed the allowable operating temperatures of some electronic components so that the use of ram air for cooling becomes impossible unless its temperature is lowered. Therefore, some other heat sink must be used and if air is to be utilized as the cooling medium, a refrigeration system is required. This results in a performance penalty to the aircraft by reason of the weight of the refrigeration system, and because power is required to operate the refrigeration system, which increases the fuel consumption. Consequently, it is desirable to provide electronic equipment cooling with the minimum flow of cooling air in order to minimize the resultant range penalty.

If the electronic equipment heat load in the cabin of the aircraft is simply rejected to the surrounding cabin air, as was the practice in the past, the cooling load in the cabin conditioning system will be increased by exactly that amount. However, if the equipment is thermally insulated from the cabin and is designed to be cooled by exhaust cabin air, just before the air is to be dumped overboard, no extra load is imposed on the air conditioning system, provided the amount of air required for cooling equipment is equal to or less than that required to cool the cabin. Such of the electronic equipment as is not located in the cabin must be cooled directly with air supplied by the airplane conditioning system, and accordingly places a definite load on the conditioning system. Thus, the cooling of the electronic equipment carried by high speed aircraft imposes a range penalty under all flight conditions, thereby increasing the importance of keeping the required cooling air flow to an absolute minimum.

From the simple heat balance equation of a piece of electronic equipment which has a fixed heat rejection, it is obvious that the cooling air flow required can be minimized by either decreasing the cooling air temperature at the inlet to the equipment or increasing the exit air temperature. The inlet air temperature is a function of the characteristics and design of the aircraft refrigeration system and supplies air at a temperature as low as is compatible with other airplane considerations. If the exit temperature can be increased while holding the inlet temperature constant, a smaller volume of air is required to remove the fixed heat load, and if this increase in the component surface temperatures, that is, if the components can be maintained at a temperature at which they are reliable in operation, improved cooling efficiency will have been achieved.

The major part of the heat dissipation from electronic equipment is generated by the vacuum tubes, and efficient cooling of any electronic package requires that they be efficiently cooled. Also, since vacuum tubes normally have higher allowable surface temperatures than the rest of the components, efficient cooling of tubes will permit a higher exit air temperature from the package, thus accomplishing the objectives mentioned above. One approach which has been employed to improve cooling efficiency is the so-called cold-plate technique, which utilized a double-walled metallic container for the electronic package, with the cooling air directed through the double wall. The tubes are enclosed in tightly fitting shields, which, in turn, are clamped to the colder wall of the container. Heat is transferred from the tubes to the shields and thence to the cold plate by conduction, and from the cold wall to the cooling air by convection. With careful design, the cold wall package does not appreciably add to the weight of the equipment, but the system has certain inherent inefficiencies. It is generally agreed that for reliable operation of most sub-miniature electron tubes, the average temperature of the envelope must be kept below 280° F. It has been found that to accomplish this, the shield enclosing the tube must be kept to about 270° F., and the cold plate kept to about 220° F., with the consequence that the maximum temperature at which the cooling air can be discharged is about 180° F. This increase in exit temperature results in some improvement in the efficiency of utilization of avilable coolant but the spread of 100 degrees between the exit temperature and the temperature to which the tube must be maintained indicates that further improvement is possible. That is, if the exit temperature could be made more nearly equal to tube temperatures at which reliability considerations are satisfied, then a lower volume of cooling fluid would be required.

Another aspect of the problem is the conflict between electronic design requirements and the cooling requirements of the package. In general, the electronic designer prefers to arrange components in a functional manner and, of course, it is often necessary to give special attention to the length and placement of leads to prevent pickup or interference. It will be apparent that a location of components to satisfy electronic requirements may be inconsistent with a location where the heat generating components can be efficiently cooled by the cold plate or other cooling arrangement. In general, the electronic designer is not permitted significant latitude in the arrangement of parts, and, accordingly, it is desirable that a cooling system be provided which will allow independent cooling of the hot components without sacrificing efficiency in the utilization of the cooling medium. Moreover, the system must be practical, and not materially increase the weight or volume of the electronic package.

With an appreciation of the shortcomings of available cooling systems and the problems attendant the cooling of specialized electronic equipment, applicants have as a primary object of their invention to provide a cooling system for electronic equipment operating in a natural environment which is hotter than the hottest individual components of the assembly.

Another object of the invention is to provide a cooling system for electronic equipment which will make maximum use of cooling fluid of limited availability.

Another object of the invention is to provide a system for packaging equipment wherein the conflict between electronic design considerations and thermodynamic design considerations are essentially resolved.

Another object of the invention is to provide a cooling system for electronic equipment which does not materially add to the weight or volume of the equipment.

These and other objects which will be apparent as the description proceeds, are achieved by the present invention by a combination of techniques including isolation of the hotter components from the lower temperature components both by distance and thermal insulation, insulation of the high heat density components, the low heat density components, or both, from the surrounding ambient, and passing the cooling air directly in contact with the hot components, the passages for air flow being designed to provide a sufficiently high heat transfer coefficient that the exit air temperature is not materially above that to which the hotter components must be cooled. In a preferred embodiment of the invention employing these techniques, the electronic chassis is assembled on a circuit board with low temperature heat generating components, such as resistors, mounted on one side of the board to separate them from non-dissipative components, such as condensers, which are mounted on the other side of the board. The electron tubes, which are usually of the subminiature type in equipment of the type here under discussion, are mounted on an edge of the circuit board and extend therefrom in the plane of the board. The tubes, in turn, are surrounded by conductive electrostatic shields provided with means for spacing the shields a predetermined distance from the tube envelope to provide an annular passage of controlled dimensions for the cooling air. The tubes and shields are surrounded by thermal insulation, such as light-weight foamed plastic, which insulates the tubes from the other components of the circuit and from the ambient. An air duct is formed in the foamed plastic for receiving the air after passing over the tubes and to discharge it into an external reservoir. Cooling air is drawn into the system and passes over the components in the direction of ascending temperature; that is, the inlet air first passes over the capacitors and resistors, which normally must be operated at relatively low temperatures to insure reliability, then over the exposed leads of the vacuum tubes, which have a lower permissible temperature than other parts of the tube, through the annular space between the tube and shield, and into the duct and exhausted. In this connection, it has been determined that certain areas of the tube may be operated at higher temperatures than other areas and that consequently it is unnecessary to keep the entire tube at the lowest permissible temperature in order to have reliable operation of the tube. For example, it has been found that at the hot spot on the surface of the tube, which is usually in the region of the anode, reliable operation is obtainable even if the temperature goes as high as 330° F., whereas a temperature of the order of 300° F. in the vicinity of the tube leads may cause tube failure. Consequently, the cooling air is directed to reach the tube leads first so as to cool them to the lower temperature necessary for reliability, the resulting increase in temperature of the air, however, not being so great that the hot spot cannot be cooled to a safe temperature. In a chassis which includes a plurality of tubes, as is usually the case, the air is introduced to the tubes in parallel, the volume of the air flowing over each of the tubes being adjusted, for any predetermined exhaust pressure, in accordance with the heat dissipation of the individual tubes, to provide an optimum compromise between the maintenance of all areas of the tube at a temperature where reliable operation results and an exit air temperature as high as possible. The distribution of cooling air is accomplished by metering orifices and contributes to the overall efficiency of the cooling system, inasmuch as only that coolant to maintain the tube at a reliable operating temperature is supplied to each tube, thereby reducing the overall expenditure of cooling air.

In another embodiment of the invention, the electronic assembly is more or less conventional in that the tubes are mounted perpendicularly to a flat circuit board on one side thereof, with resistors, capacitors, etc., mounted on the other side. Tube sockets are not used, however, the tube simply being supported on its leads which extend through openings in the board and are connected to the resistors and capacitors. Each module is provided with its own plug-in connector, maintenance of the system being accomplished by replacement of modules. Consequently, fewer connectors are needed than there are tubes, and the connectors being spaced from the tubes and operated at lower temperature, improved reliability is achieved. As in the above-described embodiment, each tube is surrounded with a shield which forms an annular passage for air around the tube, and the shield is surrounded by thermal insulation having a duct formed therein for exhausting the coolant. In this arrangement, the cooling air is first drawn over resistors, capacitors, etc., then flows through the openings in the board over the tube leads, through the annular space between the tube and tube shield, and thence through a metering orifive into the exhaust duct.

Other objects, features and advantages of the invention, and a better understanding of its construction and operation will be apparent from the following detailed description taken in connection with the accompanying drawings in which.

Figures 1, 2, 3:
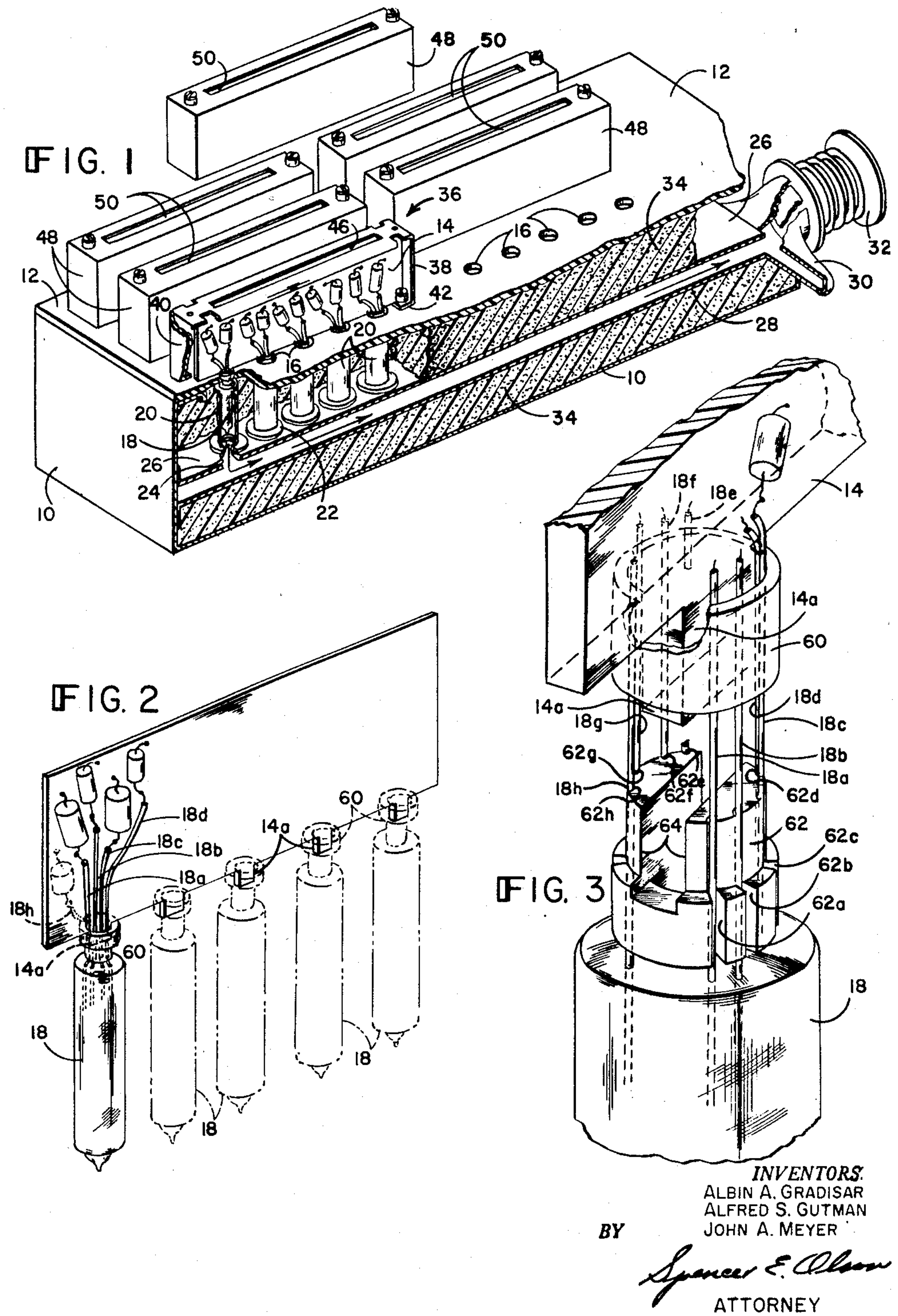
Fig. 1 is a perspective view, partially cut away, of an electronic chassis embodying the principles of the invention.
Fig. 2 is a schematic representation of a printed circuit board of the type employed in the chassis of Fig. 1.
Fig. 3 is a perspective view illustrating the mounting sub-miniature tubes on the edge of a circuit board of the type illustrated in Fig. 2.

Referring to the drawings, and more particularly to Fig. 1, the cooling techniques in accordance with this invention are particularly applicable to electronic equipment made up of a series of modules or sub-components, a type of construction currently used widely in the assembly of airborne electronic equipment. In the illustrated arrangement, the supporting structure for the chassis consists generally of a rectangular box 10 having a metallic outer shell preferably formed of light-weight material, such as aluminum, having a cover 12 formed of insulating material such as glass cloth laminated plastic. The chassis is made of a plurality of sub-components or modules, each mounted on a circuit board (to be described in more detail in connection with Figs. 2, 3 and 4), vertically positioned above the container 10. The lower edge of the each of the terminal boards 14 rests on the cover 12 with the tubes 18 of the sub-chassis depending therefrom and passing through openings 16 in the cover 12. A tube shield 20 surrounds each of the tubes, to provide electrostatic shielding and to form an annular passage for cooling air around the tube. The lower end of each tube shield rests on an orifice plate 22 which has an opening 24 therein for controlling the volume of air passing over each tube. The orifice plates 22 are supported on plate 26, spaced from and parallel to cover 12, plate 26 with plate 28 forming an exhaust duct extending across the width of the box 10. At the right end of the duct, as viewed in Fig. 1, the duct narrows into a manifold 30, which, in turn, is connected to exhaust coupling 32. The spaces between cover 12 and plate 26, and between plate 28 and the bottom plate of container 10, are filled with a light-weight thermal insulation 34, such as foamed plastic, which serves to thermally insulate the tubes to prevent the heat dissipated thereby from affecting the rest of the equipment.

Each of th ecircuit boards 14 is supported in a frame 36 preferably formed of thin, light-weight sheet metal with upstanding ends 38 and 40, which may be secured to cover plate 12 as by screws 42, and a top portion having a rectangular aperture 46 therein. An electrostatic shield 48, essentially a rectangular open-bottomed box, also formed of light-weight sheet metal, is provided for each sub-chassis, fitting over the support 36. Each of the shields has a rectangular aperture 50 therein, located to be in register with the aperture 46 in the support 36 when the shield is in place, to permit the entrance of cooling air and distribution along both sides of the board 14.

From the description thus far, it will be seen that the tubes of the chassis are thermally insulated from the ambient in which the equipment is placed, and from each other, and from the other parts of the chassis which are normally operated at a lower temperature than the tubes. With the tubes thus insulated, it is obvious that there can be no cooling of them by natural convection, and accordingly, air must be passed over them to remove the heat which they dissipate. In the disclosed arrangement, ambient temperature air (if the equipment is located in a conditioned cabin), or air from an air conditioning system (if the equipment is located outside a conditioned cabin), is drawn through the aperture 50 of the electrostatic shield 48 and passes over both sides of the circuit board 14 to first cool the resistors and capacitors of the circuit which are assembled thereon. After passing the circuit board, with some increase in temperature, the air passes over the leads of the tubes 18, the leads being exposed on either side of the board 14, and enters the annular space between the tube envelope and the tube shield. It is generally recognized that the tube in the vicinity of the leads must be kept cooler than other parts of the tubes for reliable operation, since electrolysis in the glass is most likely to occur in this area at elevated temperatures. By cooling the tube leads and the base prior to the other parts of the tube these sensitive areas are kept the coolest. In passing over the tubes, the air temperature is further increased, there being a substantial gradient from the base to the top of the tube, the openings 24 in the orifice plates 22 being designed to provide a flow of air therethrough to provide a maximum exhaust temperature consistent with cooling of the tube to a temperature to insure the desired reliability. As an example, in a system embodying the invention, it is possible to exhaust the cooling air from the electronic package at a temperature of 250° F. while maintaining the temperature of the tube sufficiently low for reliability, say 330° F. at the hot spot of the tube. The heated air from all of the tubes of the chassis enters the duct formed by plates 26 and 28 and is exhausted through coupling 32 into a reservoir separate from the equipment, preferably overboard in the case of an aircraft. The exhaust equipment for removing the heated air from the package forms no part of the present invention, and consequently has not been illustrated, but in general, must possess the properties of providing a pressure differential between the inlet aperture 50 and the exhaust manifold 30 to draw cooling air through the system with sufficient velocity to provide a satisfactorily high heat transfer coefficient.

It will be noted that the tubes are cooled in parallel; that is, the supply of air entering openings 50 after passing circuit board 14 is presented to all of the tubes (in that module), the distribution of the air therethrough being determined by the sizes of the orifices associated with the several tubes. Thus, any tube can be mounted on the board in a position compatible with favorable electronic design, yet can be satisfactorily cooled by proper design of the orifice. Parallel flow also permits selection of orifice sizes to regulate the amount of air flowing over the tubes in accordance with their heat dissipation, so as to expend only that quantity of air necessary to maintain the tube at a safe temperature. With some tubes it may be possible to exhaust the air at a higher temperature than with others, or adequate cooling may be possible with less air flow, thus permitting considerable flexibility in the placement of parts while affording adequate cooling. While the system has been described as having only tubes extending from the circuit board and thermally insulated from the rest of the circuit, other dissipative components capable of operating at elevated temperatures, for example certain types of resistors and possibly transformers, may be similarly mounted and subjected to the preferential cooling afforded by the parallel flow system.

As was noted earlier, much of the heat dissipated by vacuum tubes is transferred by conduction by the metallic leads of the tube, and accordingly to remove the heat from the system, means must be provided efficiently to transfer this heat to the coolant. In accordance with this invention, tube sockets of the conventional type, which would prevent flow of air in direct contact with the tube leads, are eliminated, baseless tubes 18 instead being employed and mounted on an edge of the circuit board 14 as shown in detail in Figs. 2, 3 and 4. As best seen in Figs. 2 and 3, one edge of the circuit board 14 is provided with a series of projections or tabs **14*a* at the points where the tubes are to be located. The tube is joined to the tab 14*a* by a two-piece retainer, formed of insulating material such as "Teflon," consisting of a ring 60 and a serrated plug 62 having a diametral slot 64 formed therein for receiving the tab 14*a*. Since most electron tubes have eight leads, plug 62 is formed with eight longitudinal serrations or grooves 62*a*, 62*b*, 62*c*, etc., distributed over those portions of the periphery not occupied by the slot 64, preferably with four on each side of the slot. The grooves are of a size to receive the leads 18*a*, 18*b*, 18*c*, etc., of the tube 18 with sufficient clearance to permit assembly of ring 60 over the upper end of the plug and to allow a passage for air around each of the leads. During assembly, the leads of the tube are placed in the grooves of plug 62 as shown, the ring 60** placed over the plug to retain the leads in the grooves, this assembly then being affixed to the circuit board by inserting tab 14a into slot 64 with the tube leads distributed to opposite sides of the board. With the leads soldered to terminals or other circuit components on the board 14, a relatively rigid assembly results, the tab 14a and the retainer serving to position the tube in the plane of the board. It will be seen that this construction exposes the leads of the tube whereby air flowing over the sides of the board may pass in direct contact with the leads as it flows toward the tube envelope.

Figures 4, 5:
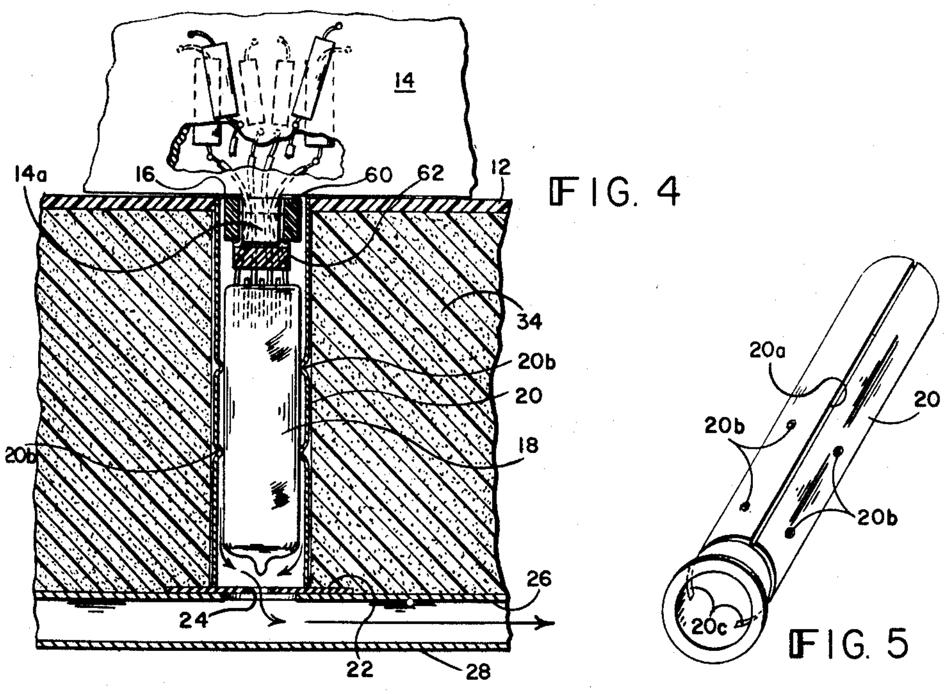
Fig. 4 is a fragmentary cross-sectional view of a portion of Fig. 1 illustrating the details of the tube mounting and tube shilde.
Fig. 5 is a perspective view of a tube shield for providing an annular air passage around the tubes of the assembly.

After flowing over and cooling the leads, the air is constrained to flow close to the tube envelope 18 by tube shield 20, which surrounds the tube and is embedded in the foamed plastic 34. In the fabrication of the package, the tube shields are positioned between plate 26 and the cover 12, in register with the openings 16 in the cover, and with the orifice plate 22 in place, the volume between the plates is filled with foamed plastic, such as polyisocyanate, a two-component foam-in-place plastic material, which is non-toxic, will withstand normal operation temperatures of 300° F. and will not support combustion. The foamed plastic is light in weight, having a density as low as 3 to 4 pounds per cubic foot, when sufficient air is introduced, yet forms a strong, rigid, self-supporting structure. Unlike conventional tube shields, the shield 20 is provided with a longitudinal slit 20a extending from the lower end over most of the length of the shield which terminates in a cut 20c extending around most of the periphery to shield 20, as shown in Fig. 5, to allow radial expansion of the shield. In addition, a plurality of dimples 20b are formed in the wall of the shield, for example, at two locations along the length thereof with three dimples equally spaced around the shield at the two locations. The purpose of the dimples is to maintain the dimension of the angular space between the tube and shield at a predetermined value. In a system constructed in accordance with the invention, it was found that a space between the tube and shield of .030" was necessary to maintain a satisfactory temperature gradient along the tube, but inasmuch as the manufacturing tolerance on the diameter of sub-miniature tubes is in excess of .030", it is impossible to maintain this spacing without the custom manufacture of a shield for each tube, a practice which obviously could not be tolerated where mass production is indicated. The provision of dimples 20b, which extend radially inward from the wall of the shield by .030", and together with the spring action afforded by slot 20a and cut 20c, insures that the tube envelope is always spaced .030" from the shield in spite of variations in the diameter of the tube. Apart from the heat transfer requirements, the shield also serves rigidly to position the tube to minimize any strain which might be placed on the connections of the tube leads to the circuit board 14 by shock or vibration.

At the base of each shield is a thin plate 22 having a sharp-edge metering orifice 24 therein to proportion the amount of air for each tube in accordance with its power dissipation. From the system standpoint, the orifice diameters of the several tubes are so designed, that for any predetermined exhaust pressure, each tube receives the proper amount of cooling air to maintain the tubes at a temperature which will insure reliable operation. To review, the cooling air, after passing over the circuit board 14, flows over the tube leads, through the passages of controlled area between the tubes and their respective shields, through the metering orifices, and then into the exhaust chamber or duct formed by plates 26 and 28.

It is emphasized that the employment of the foamed plastic in the system does not appreciably add to the volume or weight of an electronic package employing conventional cooling techniques. By virtue of the structural properties of the plastic, the chassis may be made of much lighter gauge stock than is necessary in conventional packaging with the consequence that the overall assembly may be lighter in weight than the conventional assembly. From the standpoint of volume, the space around the tubes in conventional packages is normally open, to permit cooling by natural convection, but nonetheless contributes to the overall volume of the package; thus, the placement of the foamed plastic around the tubes in the present system really does not contribute to the overall volume of the package.

Figure 6:
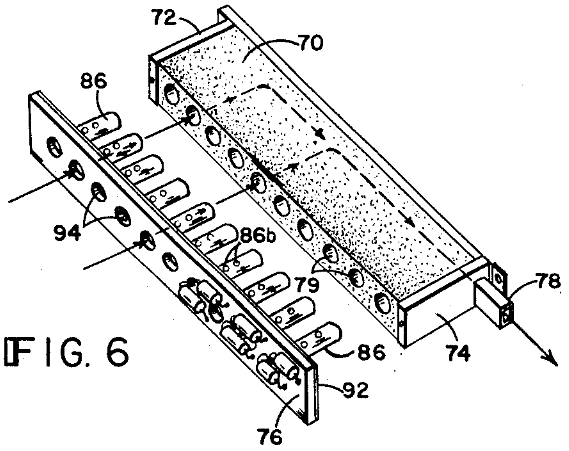
Fig. 6 is an exploded schematic representation of an alternate packaging arrangement embodying the principles of the invention.
Figure 7:
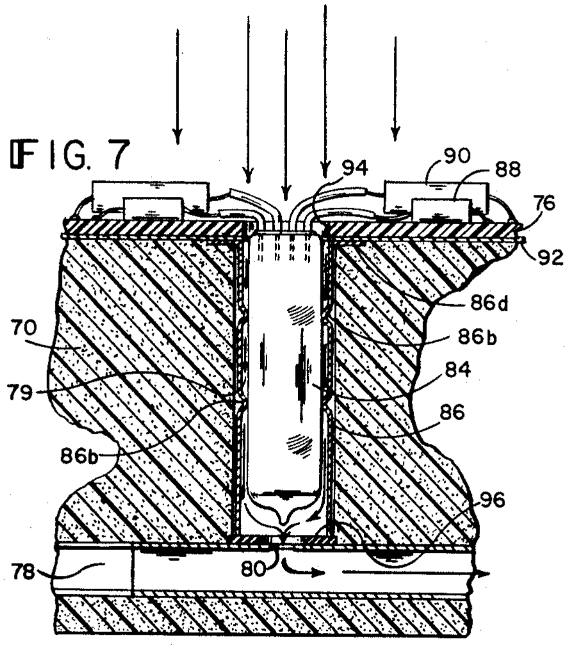
Fig. 7 is a fragmentary cross-sectional view of a portion of Fig. 6 showing the details of the tube mounting and its shield.

While the edge mounting of the tubes on the circuit board affords optimum cooling of the tube leads as above-described, the advantages of the invention may also be realized by positioning the tubes perpendicular to a circuit board on one side thereof, and arranging the other circuit components, such as resistors and capacitors, on the other side of the board as shown in Figs. 6 and 7. In Fig. 6, the invention is illustrated as embodied in a single sub-chassis module, instead of in an integrated system as was the case in Fig. 1, it being understood however, that a group of the assemblies of Fig. 6 may be placed side by side to form a larger assembly if the situation requires. In this case, the foamed plastic, which may be polyisocyanate as in the previously described system, is cast into a rectangular shaped block 70 and fitted with metallic end caps 72 and 74 whereby a chassis board 76 (to be described in more detail) may be secured thereto, as by screws. An air duct is formed in the block near one edge thereof, substantially co-extensive with the block, and may be constructed of a tube 78 formed of laminated plastic insulating material having a rectangular cross-section and closed at one end and open at the other end for the exhaust of air. A series of cylindrical openings 79, the number depending upon the number of tubes in the chassis to be cooled, are formed in the block 70 and extend across the block and communicate with the duct 78 through orifices 80 (Fig. 7) formed in the upper wall of the duct. The sizes of the several orifices are designed so that for any predetermined chamber exhaust pressure, each tube receives the proper amount of cooling air.

The electronic assembly is mounted on a circuit board 76, which may be formed of laminated plastic, with the tubes 84 and shields 86 therefor mounted on one side perpendicular to the board, and the remaining circuit components, such as resistors 88 and capacitors 90 mounted on the other side. As can best be seen in Fig. 7, the tube shield 86 is similar in construction to that illustrated in Fig. 5, having a longitudinal slot and dimples 86b, but instead of being cast into the foamed plastic is joined to the circuit board 76 as an integral part thereof. To this end, the underside of board 76 may be copper-clad as indicated at 92, and one end of the shield 86 provided with a flange 86d, is soldered thereto. The tube 84 is fitted within the shield, the tube leads passing through an opening 94 in circuit board 76 and joined to the other circuit components and/or terminals on the board. The rigid attachment of the tube shield 86 to the board 76, together with the spring clamping action between the shiled and tube, minimizes strain on the tube leads, and provides a mechanically satisfactory assembly even in the absence of conventional tube sockets.

It will be noted that the circuit board 76 together with the tubes and their shields is separable from block 70, and consequently, in order to prevent air from leaking around the lower end of shield 86 into the annular surrounding the shield, a gasket 96 is provided around each of the orifices 80 in duct 78.

The elimination of the tube sockets allows cooling air to be drawn directly over the tube leads, which are covered only to the extent that some electrical insulation may be required. As in the earlier-described system, the cooling air passes close to the tube envelope to effect a high heat transfer coefficient, and the amount of air supplied to each tube is determined by the size of the orifice, which, in turn, is proportional to the heat dissipation of the tube. Parallel flow of cooling air is employed, the low temperature inlet air first passing over the low temperature components and then distributed among the several tubes of the chassis in accordance with their requirements. After discharge through the orifice associated with each tube, the air from all tubes passes through the common exhaust duct 78 for discharge into a reservoir separate from the chassis.

Using the techniques described above, it has been possible to construct compact, strong, light-weight electronic packages from which the cooling air could be exhausted at temperatures as high as 250° F. and with the temperatures of all electronic parts low enough to insure their reliability. Capacitor temperatures were kept below 185° F., and electron tube base temperature at or below 300° F. and hot spot temperatures were kept at or below 330° F. From the foregoing, then, it will be apparent that the packaging and cooling method combines the reliability of the electronic equipment with cooling air economy and allows the electronic designer complete freedom in the placement of components.

Figure 8:
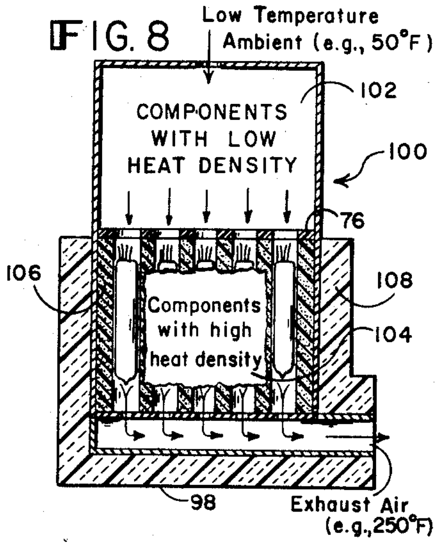
Figs. 8, 9 and 10 are schematic diagrams illustrating the application of the invention to different ambient conditions.

From the foregoing description of the systems of Figs. 1 and 6, it will be apparent that they are applicable to the situation where the chassis is located in an ambient of sufficiently low temperature that the ambient air can be used for cooling purposes. This situation is schematically represented in Fig. 8, which will serve to summarize the detailed description presented above and form a basis of comparison with other ambient conditions. In Fig. 8, the electronic package 100 is shown as a rectangular chamber having components of low heat density, which would include resistors and capacitors, grouped together in one area 102, and components of high heat density, such as vacuum tubes, grouped together in another area 104, spaced from area 102. The package 100 is located in an ambient of relatively low temperature, e.g., 50° F., a condition which might prevail in an air-conditioned cabin of an aircraft. This air is suitable as a coolant, and may be drawn through the package in the direction indicated by the arrows to first pass over the components with low heat density, and then over the components of high heat density, with parallel distribution, and exhausted, say at 250° F. In order not to heat the air in the cabin, the exhaust air is discharged into a reservoir external of the cabin, preferably overboard. In accordance with the previous description, the hot components are thermally insulated from each other and from the components with low heat density by a mass thermal insulation, indicated at 106, to prevent the transfer of heat from the former to the latter. The hot components are also thermally insulated from the ambient by thermal insulation indicated at 108 to prevent transfer of heat therefrom to the ambient, but the components in area 102, since their operating temperature is not appreciably above that of the ambient, need not be thermally insulated from the ambient.

Figure 9:
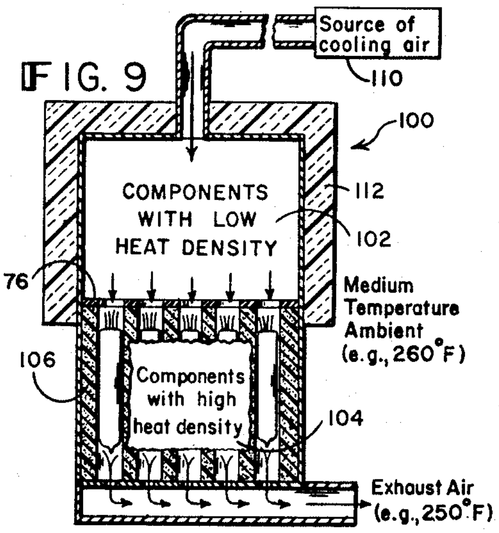

As shown in Fig. 9, the requirements for thermal insulation are reversed when the package is located in an ambient having a temperature comparable to that of the exhaust air; e.g., 260° F. where an exhaust temperature of 250° F. affords reliable cooling. In this situation, ambient air obviously cannot be used as the coolant, it being necessary to supply air from an external source 110, which may be an air-conditioner delivering air at 50° F. As in Fig. 8, the hot components are insulated from each other, and from the components with low heat density by insulation 106, the cooling air passing over the components to cool the same and thereafter exhausted, say at 250° F. The ambient being at approximately the same temperature, it is immaterial whether the heated air is exhausted to an external reservoir or to the ambient, and inasmuch as the ambient temperature is lower than the safe operating temperature of the hot components, thermal insulation between the hot components and the ambient will not contribute to the cooling efficiency. The ambient temperature, however, exceeds the safe operating temperature of the components in area 102, and accordingly, the latter must be thermally insulated from the ambient, as by a covering of thermal insulation 112.

Figure 10:
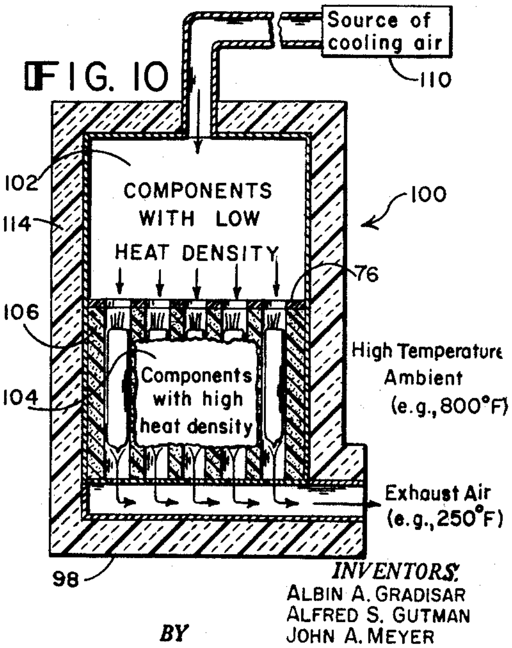

Referring to Fig. 10, when the ambient temperature exceeds the safe operating temperature of the hot components, for example, an ambient of 800° F., which might occur in a furnace or near the skin of a supersonic aircraft, the entire package must be thermally insulated from the ambient, as by a thick covering of thermal insulation 114. As before, area 102 is thermally insulated from area 104, and cooling air drawn through the package from an external supply 110, for exhaust say at 250° F., into either an external reservoir or the ambient.

To summarize, in each of the systems of Figs. 8, 9 and 10, the components with low heat density are thermally insulated from the components with high heat density, and the latter from each other, and cooling air of suitably low temperature drawn through the package in the direction of ascending temperature, parallel flow being employed to preferentially cool the hot components. If the ambient temperature is approximately equal to the inlet temperature of the coolant, the hot components only need be surrounded with thermal insulation; if the ambient temperature is approximately equal to the exhaust temperature of the coolant, only the components with low heat density need be surrounded with thermal insulation; and if the ambient temperature greatly exceeds the exhaust temperature of the coolant, both groups of components must be thermally insulated from the ambient.

Although the invention has been described as having particular applicability in the cooling of airborne electronic equipment, it is equally useful in other high temperature environments where the availability of cooling air is at a premium. For example, the system might be employed in the packaging of well-logging equipment, high temperatures being encountered in deep wells and the problem of supplying cooling air very difficult, or in the packaging and cooling of electronic equipment installed in deep mines. Also, the system may be used to cool electronic equipment mounted near, or conceivably within a furnace, where it is necessary to thermally insulate the electronic parts from the ambient.

While particular embodiments of the invention have been shown, it is to be understood that applicants do not wish to be limited thereto since many modifications can now be made by ones skilled in the art, and applicants, therefore, contemplate by the appended claims to cover all such modifications as fall within the true spirit and scope of their invention.

What is claimed is:

1. An electronic equipment package comprising, in combination, support means for electronic components, electronic components with low heat density assembled in a first area on said support means, electronic components with high heat density assembled in a second area on said support means and spaced from said first area, a mass of thermal insulation formed with a plurality of recesses for receiving and surounding individual ones of the components in said second area for thermally insulating the same from the components in said first area and from each other, means within each of said recesses defining passages for air directly in contact with each of said components with high heat density and communicating at one end with said first area, a duct communicating with the other end of each of said passages, said passages and duct providing a path for the flow of cooling air through said package in a direction from said first area toward said second area and through said passages into said duct, and thermal insulation separating at least one of said areas from the ambient surrounding said package.

2. An electronic equipment package comprising, in combination, a flat circuit board, electronic circuit components with low heat density assembled in a group on a first area of said board, electronic circuit components with high heat density distributed along an edge of said board and spaced from said first area, a mass of thermal insulation formed with a plurality of recesses for receiving and surrounding individual ones of said components with high heat density to thermally separate the same from the components on said first area and from each other, means in each of said recesses defining a passage for air around each of said components with high heat density, each communicating at one end with said first area, a duct communicating with each of said passages at the other end thereof, and further thermal insulation arranged to thermally separate the components in at least one of said areas from the ambient surrounding said package.

3. The apparatus of claim 2 wherein said duct communicates with said other end of said passages through orifices of a size proportioned in accordance with the cooling requirements of individual ones of said components with high heat density.

4. An electronic equipment package comprising, in combination, an electronic chassis including a circuit board having resistors and capacitors assembled in a group thereon and a plurality of electron tubes assembled thereon with the leads of all directed toward said group of resistors and capacitors and the axes of said tubes disposed substantially parallel to each other, a mass of foam-in-place plastic formed with a like plurality of recesses each arranged to receive and enclose an individual one of said tubes for thermally insulating said tubes from said resistors and capacitors, from each other, and from the ambient surrounding the package, means in each of said recesses defining an annular passage for air between each tube and said foam-in-place plastic, a duct formed in said mass of plastic and communicating with all of said passages at a common end thereof, and means for drawing cooling air through said package in a direction from said resistors toward said duct, whereby the cooling air flows over said resistors and capacitors, the tube leads, and the tubes in that order.

5. The apparatus of claim 4 wherein said duct communicates with said passage through orifices proportioned to distribute the cooling air among said tubes in accordance with the heat dissipation and cooling requirements of the individual tubes.

6. An electronic equipment package comprising, in combination, a chassis including a flat circuit board having a plurality of openings therethrough and having low temperature components assembled on one side thereof and a plurality of electron tubes mounted on the other side thereof perpendicular to the board with their leads extending through corresponding opens of said openings, a cylindrical shield for each of said tubes secured to said other side of said board in register with said openings and providing an annular passage for air in direct contact with the tube, a mass of thermal insulation surrounding said shields and having a duct formed therein communicating with each of said passages, whereby cooling air drawn through said package in a direction from said one side of said board toward said duct cools the resistors and capacitors, tube leads, tube base and tube envelope, in that order.

7. An electronic equipment package comprising, in combination, a block of self-supporting thermal insulation formed with a plurality of recesses and a duct intersecting each of said recesses, an electronic chassis including a circuit board having a like plurality of electron tubes extending therefrom and arranged within said recesses, a shield for each of said tubes defining an annular passage around said tube, and an orifice plate separating each of said passages from said duct.

8. An electronic equipment package comprising, in combination, a block of self-supporting, light-weight foamed plastic material formed with a plurality of cylindrical recesses and a duct communicating with each of said recesses, and an electronic chassis separably joined to said block and including a circuit board having at least resistors and capacitors mounted thereon and a plurality of electron tubes extending therefrom and arranged to be substantially totally enclosed within said recesses.

9. An electronic equipment package comprising, in combination, a block of self-supporting, light-weight foamed plastic thermal insulating material formed with a plurality of cylindrical recesses and a duct communicating with the inner end of each of said recesses, a circuit board having at least resistors and capacitors secured thereto and a plurality of electron tubes extending from an edge of said board and lying in the plane of said board, a cylindrical shield surrounding each of said tubes and defining an annular passage between the tube and shield, said circuit board being separably joined to said block with said tubes and their respective shields inserted in said cylindrical recesses.

10. The apparatus of claim 9 wherein said duct is internal of said block and enclosed by thermal insulating material and communicates with said recesses through a like plurality of orifices having sizes related to the heat dissipation and cooling requirements of individual ones of said tubes.

11. An electronic equipment package comprising, in combination, an electronic chassis including a flat circuit board having a first class of components which must be operated at relatively low temperatures and which dissipate a relatively small amount of heat in operation assembled in a group on at least one of the flat surfaces of said board, and a second class of components which dissipate heat during operation and which may be reliably operated at higher temperatures than said first class of components assembled in a group along one edge of said board and extending therefrom substantially in the plane of said board, a mass of thermal insulation formed with a plurality of recesses arranged each to receive and enclose an individual one of the components of said second class whereby the components of said second class are thermally insulated each from the other and from the components of said first class, means within each of said recesses defining an annular passage adjacent each of the components of said second class, and a duct communicating with each of said passages through orifices of a size proportioned in accordance with the heat dissipation and cooling requirements of the individual components of said second class, said passages and duct providing a path for the flow of cooling air through said passage in a direction to first pass over the components of said first class and through said passages in direct contact with the components of said second class and into said duct.

References Cited in the file of this patent

UNITED STATES PATENTS

| | | |
|---|---|---|
| 2,045,659 | Lindenblad | June 30, 1936 |
| 2,169,109 | Muller | Aug. 8, 1939 |
| 2,412,989 | Kotterman | Dec. 24, 1946 |
| 2,583,417 | Eitel | Jan. 22, 1952 |
| 2,737,579 | Wehrlin | Mar. 6, 1956 |
| 2,774,052 | Flour | Dec. 11, 1956 |
| 2,807,789 | McCann | Sept. 24, 1957 |
| 2,825,009 | McCoy | Feb. 25, 1958 |
| 2,836,772 | Wintrode | May 27, 1958 |